United States Patent
Dyer

(10) Patent No.: US 7,245,763 B2
(45) Date of Patent: Jul. 17, 2007

(54) GRAY COMPONENT REPLACEMENT AS PART OF MARKING PROCESS CONTROL ALGORITHM

(75) Inventor: Dexter A. Dyer, Fairport, NY (US)

(73) Assignee: Xerox Corporation, Stamford, CT (US)

(*) Notice: Subject to any disclaimer, the term of this patent is extended or adjusted under 35 U.S.C. 154(b) by 809 days.

(21) Appl. No.: 10/756,304

(22) Filed: Jan. 14, 2004

(65) Prior Publication Data
US 2005/0151982 A1   Jul. 14, 2005

(51) Int. Cl.
*G06K 9/00*   (2006.01)

(52) U.S. Cl. ............ 382/167; 382/162; 382/274; 358/1.9; 358/518

(58) Field of Classification Search ............ 382/162, 382/167, 274; 358/1.9, 518, 529, 534, 3.19; 347/15; 716/1
See application file for complete search history.

(56) References Cited

U.S. PATENT DOCUMENTS

| | | | |
|---|---|---|---|
| 5,172,223 A * | 12/1992 | Suzuki et al. ............ 358/529 |
| 5,305,119 A | 4/1994 | Rolleston et al. |
| 5,402,245 A * | 3/1995 | Motta et al. ............ 358/1.9 |
| 5,528,386 A | 6/1996 | Rolleston et al. |
| 5,734,800 A * | 3/1998 | Herbert et al. ............ 358/1.9 |
| 5,764,388 A | 6/1998 | Ueda et al. |
| 5,894,358 A | 4/1999 | Ebner et al. |
| 5,923,774 A * | 7/1999 | Ostromoukhov ............ 382/162 |
| 5,973,803 A * | 10/1999 | Cheung et al. ............ 358/534 |
| 6,084,689 A | 7/2000 | Mo |
| 6,134,398 A | 10/2000 | Grace |
| 6,191,874 B1 | 2/2001 | Yamada et al. |
| 6,233,411 B1 | 5/2001 | Scheuer et al. |
| 6,239,886 B1 * | 5/2001 | Klassen et al. ............ 358/518 |
| 2002/0158933 A1 | 10/2002 | Yamamoto |

FOREIGN PATENT DOCUMENTS

EP   0 590 921   4/1994
EP   1 235 423   8/2002

* cited by examiner

Primary Examiner—Matthew C. Bella
Assistant Examiner—Ali A. B. Bayat
(74) Attorney, Agent, or Firm—Oliff & Berridge, PLC

(57) ABSTRACT

In an environment which produces images as a function of the combination of cyan, magenta, yellow and black color components on an output print, there is provided a method that 1) increases area coverage of a color that is below the threshold of development stability and 2) removes the very low area coverage color and replace it with black.

17 Claims, 7 Drawing Sheets

GRAY COMPONENT REPLACEMENT AS PART OF MARKING PROCESS CONTROL ALGORITHM

BACKGROUND OF THE INVENTION

1. Field of Invention

The present invention is directed to a method for improving the effective total area coverage in a marking process, such as printing, photocopying or the like.

2. Description of Related Art

It is obviously desired to reproduce color images such that the colors in the copy exactly, or at least closely, match the corresponding colors in the original image. Since image input and output devices are often quite different, reproducing an accurate color image often requires some form of color conversion to be applied to the image data before it is output. Systems and methods for converting original input device dependent image signals to output device dependent image signals are known to those skilled in the art. U.S. patents which address such techniques include U.S. Pat. No. 5,077,604 to Kivolowitz et al., issued Dec. 31, 1991; U.S. Pat. No. 5,087,126 to Pochieh, issued Feb. 11, 1992; and U.S. Pat. No. 5,528,386 to Rolleston et al., issued Jun. 8, 1996, each of which is herein incorporated by reference in its entirety. To one extent or another, each of these prior art systems and methods generally involve applying the input device dependent signals (e.g., RGB) to one or another systems of look-up tables by which they are converted to printer or other output device dependent signals (e.g., CMY or CMYK).

Full color revision in digital images is an image processing operation which typically takes place in two steps. First, each pixel in the image is corrected from 3-D input device dependent (e.g., RGB) or device independent (e.g., YCrCb, R'G'B', XYZ, or $L^*a^*b^*$) color space to a 3-D output device dependent color space (e.g., R"G"B" or CMY). Next, a conversion to CMYK takes place, which may include under-color removal (UCR), gray-component replacement (GCR) and linearization processes. Typically, the two color revision steps are accomplished in a single operation using a three-dimensional look-up table carrying out three-dimensional interpolation such as that described in U.S. Pat. No. 5,581,376 to Harrington, which is incorporated by reference herein in its entirety. The color revision portion of the process may also be represented as the combination of two phases: a 3-3 color space revision (e.g., RGB to R'G'B') followed by a device-dependent color space transformation operation (i.e., R'G'B' to CMYK for four color devices).

GCR is used in the printing industry to reduce the amount of ink or other marking material deposition in a particular area, which enables faster drying times and lower ink usage and cost. In addition, some level of GCR is used to make shadow details more crisp by taking away some of the cyan, magenta, and yellow in equal amounts and replacing it with black.

In a xerographic technology based printing environment, one component that drives development stability is throughput (i.e., the system or individual component output per unit of time). At high area coverage, the marking system becomes unstable due to inadequate admix time of the developer components. At very low area coverage, large residence times of the toner or other marking material in the housing impact additives present in toner or other marking material, causing the toner or other marking material to lose its ability to hold a charge. Neither is desirable.

Typical strategies for high area coverage include dead cycles where toner is added together with developer and mixed. Then printing is resumed. This solution results in reduced print speed, which is typically undesirable.

At low area coverage, the typical solution is to produce test patches which are developed on a photoreceptor, typically at inter-document zones, and taken away at a cleaner. This maintains a minimum throughput of a particular color to maintain stability. However, since these patches do not form part of the image, this solution typically results in higher costs because of unused toner that is thrown away to keep the marking system stable.

SUMMARY OF THE INVENTION

There is a need for improved methods and systems to maintain development stability in a print engine. It is particularly advantageous to maintain such stability without decreasing overall system throughput.

This invention provides systems and methods that address the above-described problems by increasing and/or decreasing total area coverage for individual color components in a color marking environment for the purpose of maintaining developer stability.

This invention separately provides systems, methods and structure that maintains a minimum throughput for each of a plurality of toner colors in a multicolor print engine by shifting and adjusting the ratio of multiple color material to black developed mass.

This invention separately provides systems, methods and structure that provides gray component replacement in a multicolor print engine when individual colors are well below a desired minimum throughput to eliminate usage of such low throughput colors through shifting and adjusting ratios of other colors and black.

In various exemplary embodiments of the systems, methods and structure of the invention, images are provided by combining colors, such as cyan, magenta and yellow to form a process black. In one exemplary embodiment, the systems and methods determine a color component with a very low coverage area that is below a threshold of development stability and provide one of 1) increasing area coverage of that color to achieve minimum throughput or 2) removing the very low coverage area of that color and replacing it with another color, such as black.

In an exemplary embodiment increased coverage may be achieved by replacing portions of a black image with process black formed by a combination of cyan, magenta and yellow to increase throughput of a low coverage area color component. In another exemplary embodiment, a very low coverage area color component may be completely eliminated, allowing that particular developer housing to be shut off, by replacing the coverage with another color, such as black.

In a particular exemplary embodiment of the systems, methods and structures of the invention, the color marking environment may be a color xerographic print engine. These and other objects, advantages and/or salient features of the invention are described in or apparent from the following detailed description of exemplary embodiments.

BRIEF DESCRIPTION OF THE DRAWINGS

Exemplary embodiments will be described based on the accompanying drawings, wherein like numerals represent like parts, and wherein.

DETAILED DESCRIPTION OF PREFERRED EMBODIMENTS

The present invention is directed to methods, systems and structures for improving coverage in a marking process, such as printing, photocopying or the like. Exemplary embodiments provide a color xerographic print engine. However, the invention is not limited to these. According to the present invention, improvement is achieved by identifying and compensating for color components that are within a zone of being unstable.

Figure 1:
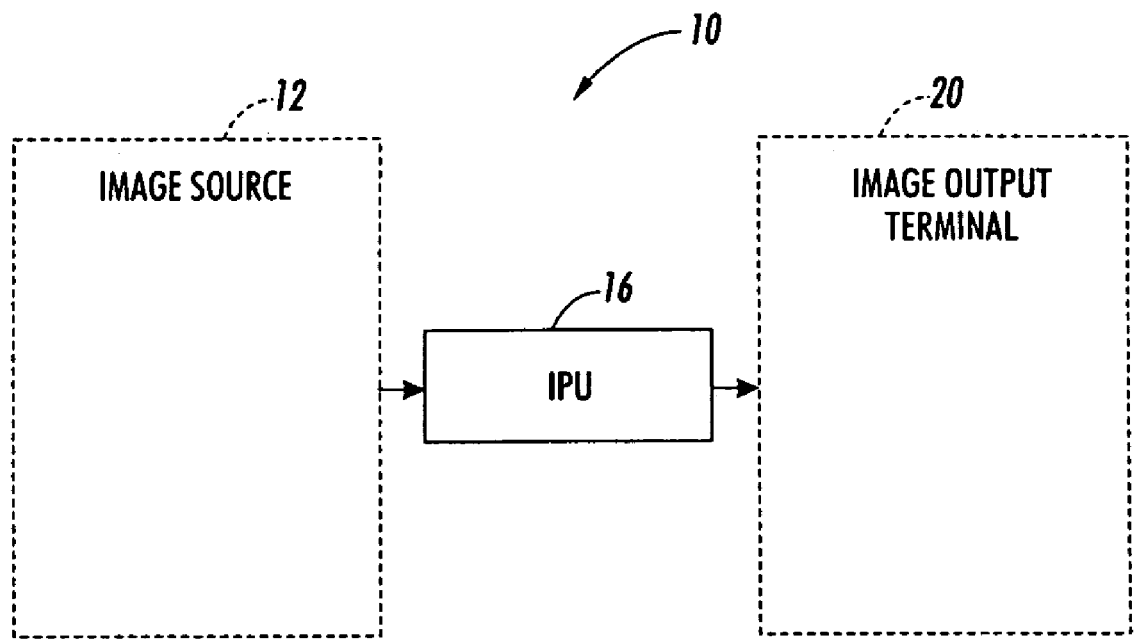
FIG. 1 is a generalized functional block diagram of an exemplary marking system according to this invention.

Referring now to the drawings where the showings are for purposes of describing preferred embodiments of the invention and not for purposes of limiting same, a color marking system, such as a digital image processing system 10, is shown in FIG. 1. An image input terminal 12 comprises an image data source, such as, a scanner, a computer image generator, an image storage device or the like. These image data sources may also include a scanner, digital copier, facsimile device or other device suitable for generating, storing and/or transmitting image data, such as a client or server of a network, or the Internet, and especially the World Wide Web. They may also include a computer image generator, an image storage device, or the like, which derives or delivers color image data, such as a digital data to an image processing unit (IPU) 16 wherein digital color image processing in accordance with an exemplary embodiment of the present invention is performed. The image processing unit 16 outputs data in a suitable format to an image output terminal 20, such as a digital color printer or other color image marking system. In exemplary embodiments, the marking system is a color xerographic print engine having four individual color markers (CYMK) as better illustrated in FIG. 2.

Figure 2:
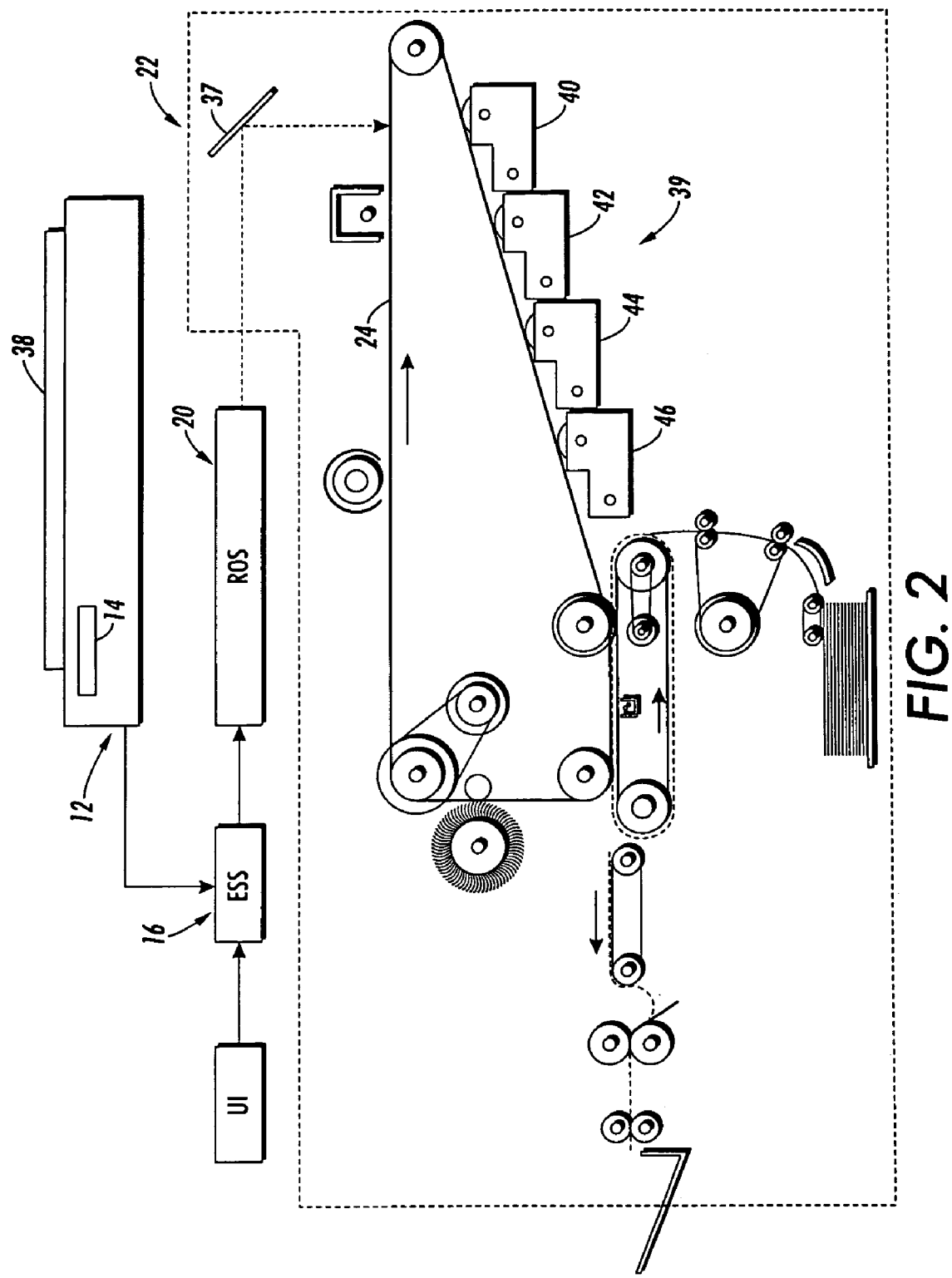
FIG. 2 is an exemplary xerographic print engine according to the invention.

Referring now to FIG. 2, during operation of the printing system 10, a multiple color original document 38 is positioned on an image source 12. Image source 12 may include any number of image sources suitable for generating or otherwise providing a digital document, such as illumination lamps, optics, a mechanical scanning drive, a raster input scanner (RIS), and a charge coupled device (CCD array) or full width subsampling scanning sensor array 14. Image source 12 captures the entire image from original document 38 and among other things, measures a set of primary color reflectances (device that reduces, green and blue reflectances) at each point of the original document. Image source 12 may convert these reflectances to device independent coordinates, including possibly a luminance-chrominance space, or they may be left in a format that is dependent upon image source 12. A preferred exemplary format is CYMK color space (cyan, yellow, magenta and black).

Image source 12 transmits image data as electrical signals to an image processing system (ESS), indicated generally by the reference numeral 16. ESS 16 converts the image data signals provided by image source 12 to either a set of device independent coordinates, or to coordinates that are dependent upon a designated output device. ESS 16 also contains data control electronics that prepare and manage the image data flow to a raster output scanner (ROS), indicated generally by the reference numeral 20. The ESS transmits signals corresponding to the desired image to ROS 20, which creates the output copy image. ROS 20 includes a laser with rotating polygon mirror blocks. Via mirror 37, ROS illuminates the charged portion of photoconductive belt 24 of a print or marking engine, indicated generally by the reference numeral 22 to achieve a set of subtractive primary latent images. ROS 20 will expose the photoconductive belt to record multiple latent images which correspond to the signals transmitted from ESS 16. Each latent image is developed with a developer material having a different color component (colorant). A black latent image may be developed in lieu of or in addition to other (colored) latent images. These developed images are transferred to a copy sheet in superimposed registration with one another to form a multicolored image on the copy sheet. This multicolored image is then fused to the copy sheet to form a color copy.

Development of the images is achieved by bringing the brush of developer material into contact with the photoconductive surface. Developer units 40, 42, 44 and 46, respectively, apply toner particles of a specific color which corresponds to the complement of the specific color separated electrostatic latent image recorded on the photoconductive surface. For example in the exemplary 4 component printing, there are separate developer units 40, 42, 44 and 46 for each of cyan, magenta, yellow and black, respectively.

Several problems can occur with such developer units. Because the toner is actively blended, printing of documents having consistently low area coverage for an individual developer unit can prevent the toner from holding its charge. Also, low area coverage may affect other system components, such as blade cleaning systems that rely on the toner for lubrication.

A color image can be defined as a set of dots, hereafter called "pixels". Each pixel has a set of attributes associated with it. For example, pixel attributes include the percentages of color components (e.g., cyan, magenta, yellow and black) that form a color in a particular color model (e.g., a CMYK color model) and the location of the dot in the color graphic image. The attributes can be used by computer rendering software applications to generate the color image.

Figure 3:
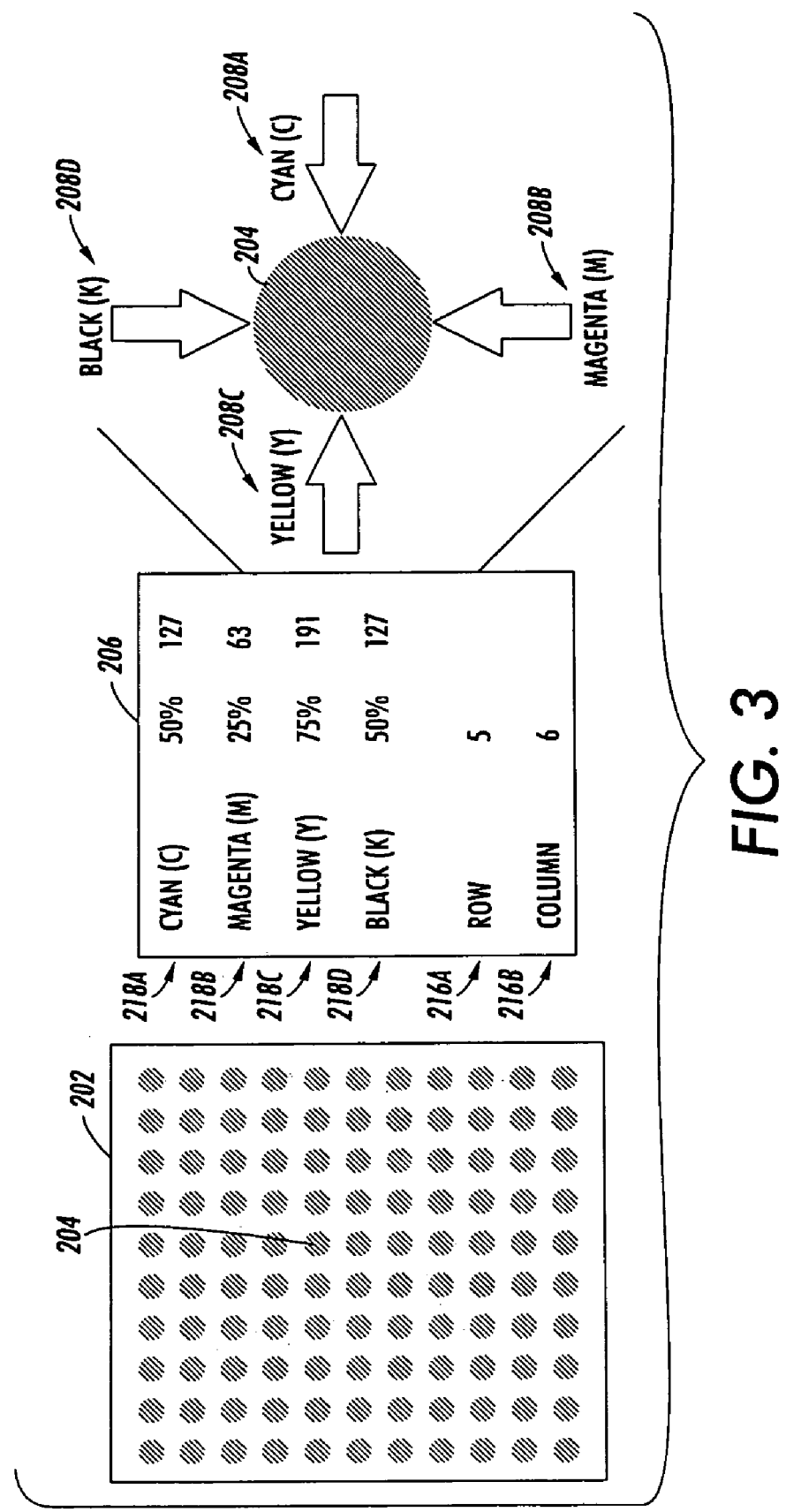
FIG. 3 illustrates a region of a color graphic image and an internal representation, or pixel, that defines attributes for a dot in the color graphic image.

FIG. 3 illustrates a region of a color graphic image and an internal representation, or pixel, that defines attributes for a dot in the color graphic image. Region 202 represents all or a portion of a color graphic image output generated by a computer system that includes multiple rows and columns of dots. Dot 204 is included in region 202. In a computer system, dot 204 is typically represented within the computer system as a picture element, or pixel, that has a set of associated attributes. The attributes associated with pixel 206 can be used by a computer system to generate dot 204.

Positional attributes 216A-216B identify the row and column positions of dot 204 in region 202. If, for example, the upper left corner of region 202 is at row 1 and column 1, dot 204 lies at row five and column five of region 202.

Color attributes 218A-218D represent the contribution of the color components that define the color for dot 204. If the computer system is using a CMYK color model, color attributes 218A-218D specify the percentage of each of the cyan (C), magenta (M), yellow (Y) and black (K) color components that can form a color in the CMYK color model, for example. Color attributes 218A-218D can be specified as percentages that represent the percentage of each color that is to be used to create the color for dot 204. For example, color attributes 218A-218D can specify 50% of the total possible amount of C, 25% of the total possible amount of M, 75% of the total possible amount of Y and 50% of the total possible amount of K should be used to generate dot 204.

The percentages specified for color attributes 218A-218D can also be defined as a number. For example, if 8 bits are used to define a color component's value, there can be $2^8$ or 256 values. The value is typically expressed as a range from 0 to 255. FIG. 3 also illustrates possible values for C, M, Y and K using an 8-bit value range between 0 and 255, inclusive. For example, the 50% values for cyan and black may be expressed as 127. The 25% and 75% values for magenta and yellow may be expressed as 63 and 191, respectively.

To generate dot 204, color attributes 218A-218D are translated into an amount of colorant, e.g., a color ink or toner. For example, color attributes 218A-218D specify the levels of colorants 208A-208D that are used to generate dot 204. For example, colorants 208A-208D can be color ink or toner, if dot 204 is to be output by a marking system such as a color printer or copier.

Gray Component Replacement/Undercolor Removal (GCR/UCR) schemes are designed to replace the gray component of a color with black. In a CMYK color model, individual color components are defined by cyan (C), magenta (M), yellow (Y) and black (K) color components. The gray component of a color in the CMYK color model is formed from equal amounts of C, M and Y color components. Such a component is sometimes referred to as a process black, since when combined the colors simulate a pure black colorant.

One technique for determining the gray component in a CMYK color model is to determine the CMY color component that has the least value, since each of the CMY color components has that value in common. For example, if a color in the CMYK color model is composed of 50% of C, 35% of M and 25% of Y, the gray component is the lesser of the three, or 25%. Each of C, M and Y contribute this amount to the color's gray component.

There are many variations to the GCR/UCR schemes each of which uses a technique for determining the portion of the gray component that is to be replaced by black. In the CMYK color model, an amount subtracted from the C, M, and Y components is added to the black component. In the above example, 25% of C, M and Y is removed and 25% is added to the K component. If the K component had an initial value of 50%, the resulting values would be 25%, 10%, 0%, and 75% for the C, M, Y and K color components, respectively.

The result of the GCR/UCR schemes is a total amount of colorant (i.e., totals for the C, M, Y and K color components) which is referred to as a GCR/UCR total. Conventional GCR/UCR techniques can overly reduce the saturation levels of color images and/or fail to ensure that a resulting GCR/UCR total satisfies individual colorant throughput levels, a threshold total area coverage (TAC) amount. That is, conventional GCR/UCR has been used for purposes other than individual throughput considerations. TAC is a measure of the total amount of colorant applied to an area (e.g., dot 204) of the output medium.

In some cases, the GCR/UCR total may unnecessarily dilute images by overly reducing color components C, M, and Y, and therefore overly reducing the saturation (density) level of color images. In other cases, the GCR/UCR total may provide insufficient color component reduction such that the GCR/UCR total is greater than an allowed TAC threshold amount. A threshold TAC amount can be used to limit the amount of colorant used to, for example, reduce cost and/or to ensure that the total amount of ink applied does not exceed the amount that can be absorbed by the output medium.

Aspects of this invention achieve control of individual color throughput through shifting of color balances using principles of GCR/UCR. It has been found that each developer unit should have a minimum acceptable throughput to prevent problems, such as improper developer charge, lubrication properties and others. Through conventional software techniques, it is possible to determine individual color component throughput by analyzing the separate color space data. Through experimentation or empirical formulas, minimum and possibly maximum throughput values can be derived for each particular developer. For example, in the following exemplary embodiments, it is assumed that an acceptable minimum area coverage is 5% of the image. Such a throughput has been found to keep toner charging properties adequate for proper printing. For typical xerographic systems, the minimum acceptable area coverage is in the range of 1% to 5%, for each developer subsystem.

Figure 4:
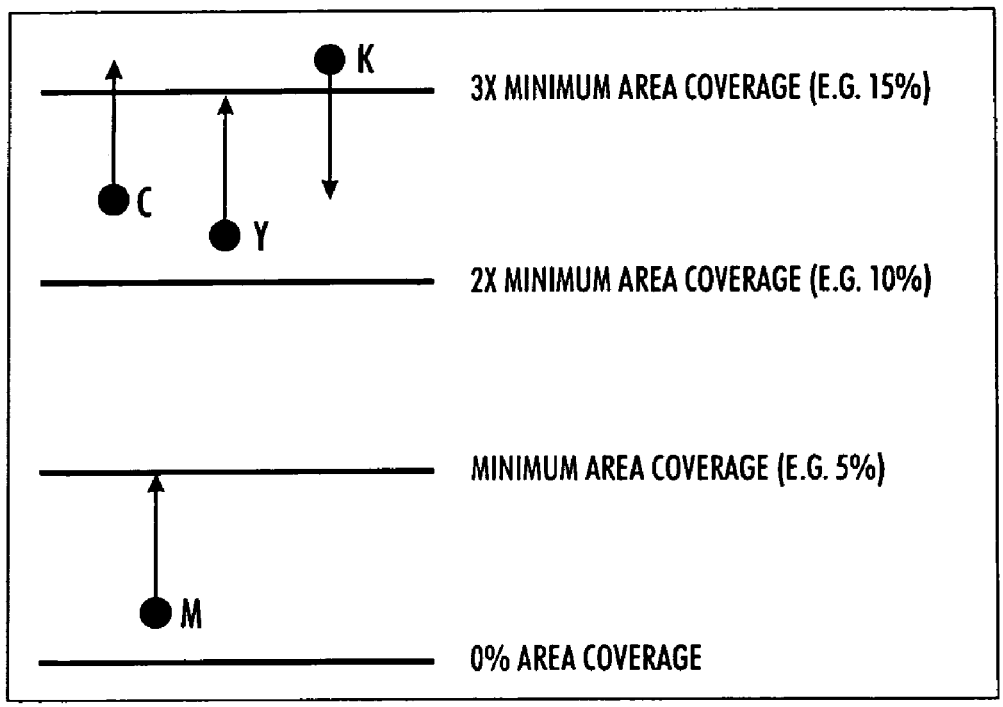
FIGS. 4-5 illustrate pictorial representations of exemplary total area coverage adjustments according to aspects of the invention.

Referring to exemplary FIG. 4, assume a document with pictorial and graphic content has area coverages as shown for each of the cyan (C) 13%, yellow (Y) 12%, magenta (M) 2%, and black (K) 16%. From this, it is determined that magenta (M) is below desirable area coverage (throughput). One way to increase this is through substitution of "process black" or gray component replacement for part of the black (K) coverage. This is achieved by adding equal parts of C, Y and M to form process black and reducing the black coverage by this amount. For example, as shown, one possible solution is to add 3% to M making 5% total (i.e., at the minimum area coverage). Then, equal amounts (3%) are also added to each of Y and C. Black (K) is then decreased by this amount. This example thus reduces the pure black coverage by 3% and substitutes 3% coverage by process black (equal amounts of C, Y, M) to achieve minimum throughput for all colors to keep individual developer units at efficient levels (i.e., all above the threshold 5% TAC).

Figure 5:
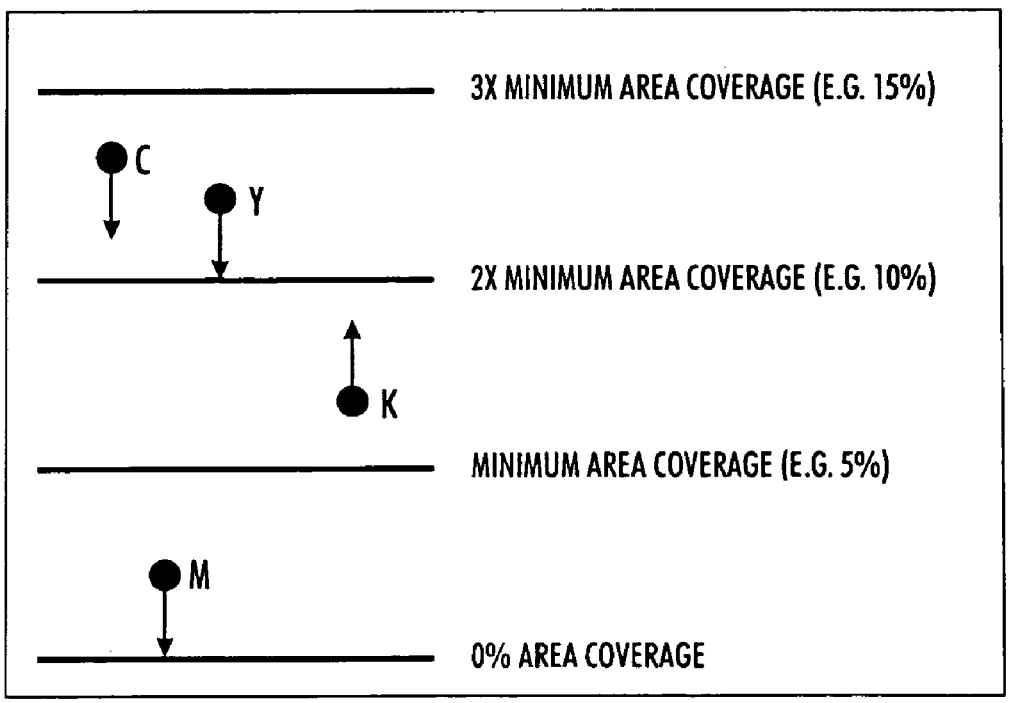

Referring to exemplary FIG. 5, another example is shown with area coverages of 13% C, 12% Y, 7% K and 2% M. One possible solution would be to increase each of C, Y, M by 3% to make M greater than 5%. However, when K is reduced by this amount, its value drops below the 5% minimum. As such, this solution is sub-optimal. An alternative solution results in complete omission of M coverage so as to prevent the problem. This may be achieved, for example, by increasing K by 2% and decreasing each of C, Y and M by 2%. This effectively substitutes pure black for area coverage where process black or gray component may be used. This results in 9% K, 11% C, 10% Y, 0% M, allowing the magenta (M) developer to be entirely shut down. Obviously, these are just examples of the possible shifting and replacement options available. For example, the adjustments may make each component above the minimum throughput value.

Figure 6:
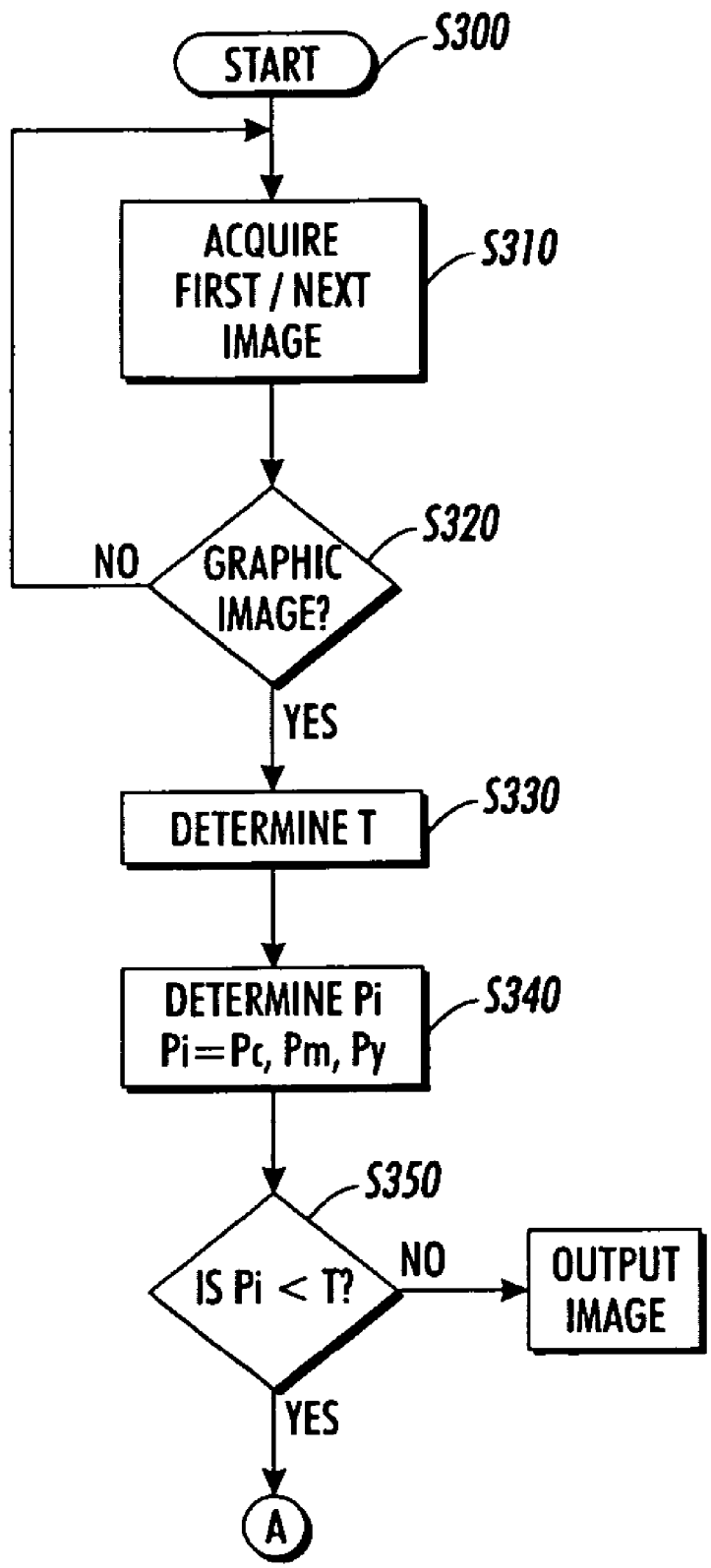
FIGS. 6, 7 and 8 provide a flow diagram illustrating an exemplary method according to the invention.
Figure 7:
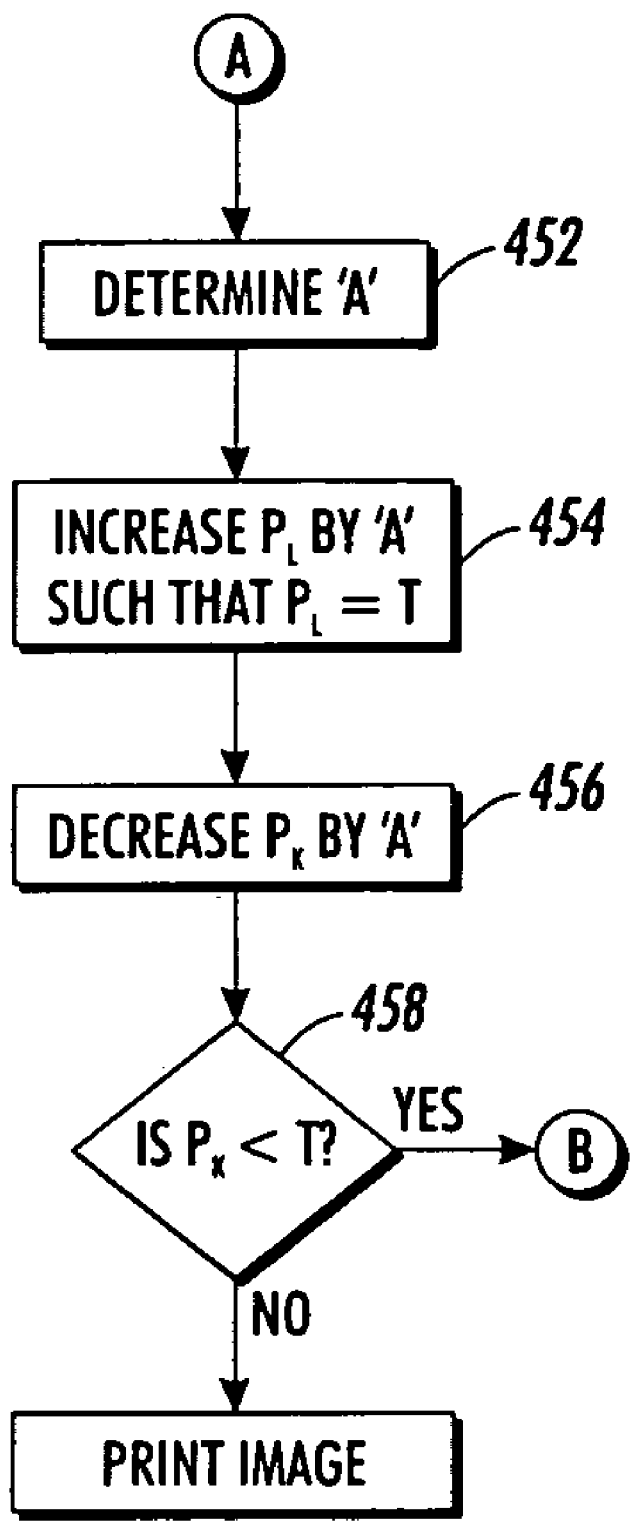
Figure 8:
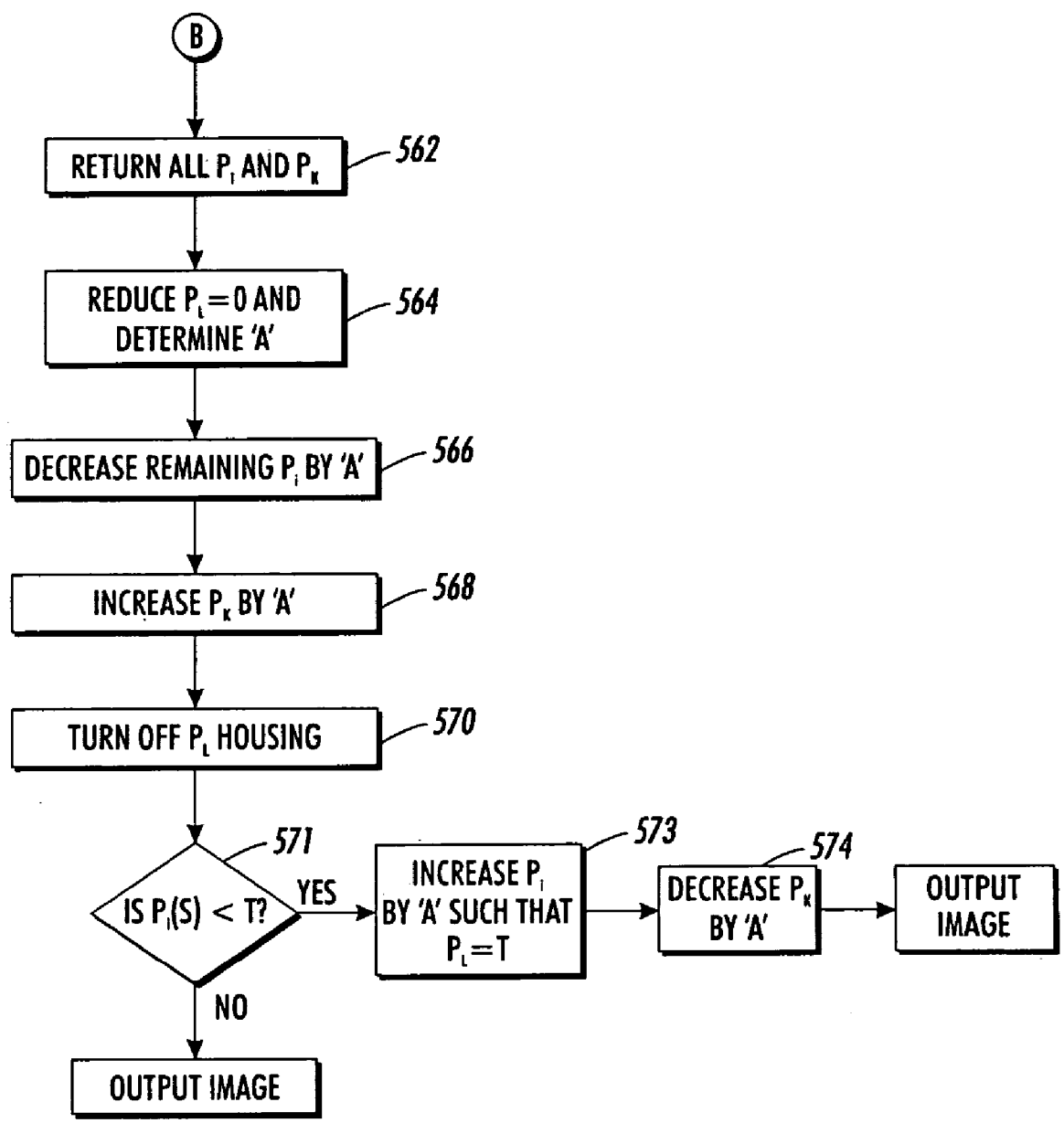

FIGS. 6-8 provide a flowchart illustrating one exemplary method according to the invention that performs gray component replacement to satisfy individual color throughput levels.

Referring to FIG. 6, beginning in step S300, the system obtains an image at step S310, and determines the color parameters for the image. Then, in step S310, a determination is made whether the image is a graphic image. If the image is either text or an all black image, the following steps described below are assumed to be not applicable, and so the process repeats steps S310 and S320. If the next image to be printed is determined to be a graphic image in step S320, a threshold T is determined in step S330. The threshold is a minimum level that would assure development stability. The threshold level (driven by the materials design including additive levels and the development subsystem mechanical and electrical design) is empirically determined through stress testing. After T is determined in step S330 the individual component parameters Pi for and suitable level amounts each color component are determined for the graphic image in step S340. Pi includes the non-gray component color parameters for cyan ($P_C$), magenta ($P_M$) and yellow ($P_Y$). Next, in step S350, it is determined which if any of the color parameters Pi are below the threshold parameter T. If none of the color components (Pi) are below the threshold T then the image is output, e.g., by printing, in its current state.

However, if one or more of the non-gray color components is determined at step S350 to be below the threshold, the process continues to step S452, as shown in FIG. 7. If a color component parameter is below the threshold, it is considered unstable. In step S452, a factor 'A' is determined. The factor 'A' is the difference between the unstable color component ($P_C$, $P_M$ or $P_Y = P_L$) and the threshold T. After 'A' is determined in step S452, the process continues to step S454, where the parameter for the unstable color component ($P_L$) is increased by at least 'A' such that the unstable color component is at least equal to the threshold T, and the remaining stable color components are also increased by 'A'. For example, in a CYMK color space, each of the C, Y and M components would be increased by 'A' for a gray component (or process black) that can be substituted for an equal amount of the black image. The black component parameter ($P_K$) is accordingly decreased by 'A' in step S456.

For example, assume that the minimum throughput requirement or threshold for stability for each color is 5% (T=5%). If the customer is running a document that calls for 2% magenta ($P_M$), 15% yellow ($P_Y$), 17% cyan ($P_C$) and 15% black ($P_K$), clearly the magenta will be unstable as 2% is less than the minimum 5% required. The algorithm would then replace 3% of the black with 3% cyan, 3% yellow, and 3% magenta to bring the mix to 5% magenta, 18% yellow, 20% cyan, and 12% black. The result would bring all four colors into the stable development zone.

After bringing all of the non-gray component parameters into the stable development zone, a determination is made in step S458 as to whether the black component parameter is still stable, or in other words, is still above the threshold T. If the black component parameter is still in the zone of stability, then the image is output. If not, then the process continues to routine B (FIG. 8).

In step S562 of routine B, all of the parameters are returned to their original numbers, since the first possible solution was found unacceptable. At this point, in step S564, a second option is pursued in which the color parameter $P_L$ is reduced to zero (0), and 'A' is determined to be the amount that $P_L$ was reduced to bring it to zero. The remaining color component parameters are also decreased by 'A' in step S566, and the black component parameter is increased by 'A' in step S568. The associated housing for the $P_L$ component is turned off in step S570. A determination is made as to whether any of the non-gray color component parameters are below the threshold T in step S571. If none of the color component parameters are below the threshold T, the image is output. If any of the non-gray color component parameters are below the threshold, the process continues to routine C.

In step S573 of routine C, all of the non-gray color component parameters are increased by an amount 'A' such that $P_L$ is equal to the threshold T. In step S574, $P_K$ is decreased by 'A' and the image is output.

In various embodiments of the invention, the algorithm may assure that any areas that needed the low throughput color component to make another color would be considered in the calculation. For example, if the Magenta (M) component could not be reduced to zero because it is needed for another non-black color combination, the algorithm could default to the first part of the invention as shown in steps S573 and S574 rather than attempting to decrease the color component entirely.

In another embodiment, the present invention is implemented where two or more color parameters are running below the threshold. Similar computations are derived to find a solution where all non-gray color components are above the threshold or entirely off.

While the invention has been described in conjunction with exemplary embodiments, these embodiments should be viewed as illustrative, not limiting. Various modifications, substitutes, or the like are possible within the spirit and scope of the invention.

What is claimed is:

1. A method for processing at least one color image based on individual color component throughput to obtain color component stability, the method comprising:
    a) determining whether a first color component parameter of a plurality of non-gray color component parameters is less than a threshold parameter that corresponds to individual color component minimum throughput;
    b) shifting individual color component area coverages to either each be above the threshold parameter or to completely reduce to zero the coverage of first color component; and
    c) shifting a black color component parameter in an amount equal to, but opposite from, the shift of the first color component.

2. The method of claim 1, wherein if the first color component parameter is less than the threshold parameter, b) comprises determining 'A' by increasing the first color component by an amount 'A' such that the first color component parameter is at least equal to the threshold parameter; and
    c) comprises decreasing the black component parameter by 'A'.

3. The method of claim 2, further comprising, determining if the black color component parameter is less than the threshold parameter.

4. The method of claim 3, further comprising when the black color component parameter is less than the threshold parameter;
    increasing the black color component parameter by an amount 'A' such that the second color component parameter is at least equal to the threshold parameter; and
    decreasing the first color component parameter by 'A'.

5. The method of claim 1, wherein the plurality of non-gray color components include cyan, magenta and yellow, and each of the plurality of non-gray color components are shifted by an equal amount.

6. The method of claim 5, wherein each of the cyan, magenta and yellow components are shifted by 'A'.

7. The method of claim 1, wherein the threshold maintains individual developer stability in a xerographic process having multiple developers.

8. A method for improving printing stability in a color printing process wherein a color component is defined by a black color component, and a non-gray component, and the non-gray component comprises a plurality of non-black color components, the method comprising:
   a) determining a plurality of parameters that correspond respectively to the color components;
   b) determining a threshold component parameter;
   c) determining a parameter for each of the color components, the parameter including in its numerator an amount of the non-gray component or the black color component and including in its denominator the color component;
   d) determining a low color component parameter by determining if one or more of the non-gray component parameters is less than the threshold component parameter; and
   e) decreasing, if any one of the non-gray component parameters is less than the threshold component parameter, the black component parameter by an amount 'A' such that a lowest color parameter is at least equal to the threshold parameter and, increasing the each of the plurality of non-black color component parameters by 'A';
   f) determining if all of the color component parameters are above the threshold parameter; and
   g) outputting the image if e) determines that all of the color component parameters are above the threshold parameter.

9. The method of claim 8, wherein e) includes determining if the black color component parameter is less than the threshold parameter.

10. The method of claim 9, wherein if the black color component parameter is less than the threshold parameter, the method further comprises:
    determining a lowest color component parameter;
    decreasing each of the color component parameters by 'A' such that the lowest color component parameter is reduced to zero;
    increasing the black color component parameter by 'A'; and
    turning off a developer housing for the associated low color component parameter.

11. The method of claim 8, wherein the non-gray color component includes a cyan color component, a magenta color component, and a yellow color component.

12. The method of claim 11 wherein a) determines whether any one of the cyan color component parameter, the magenta color component parameter and the yellow color component parameter is less than a threshold parameter that corresponds to an individual color component minimum throughput.

13. The method of claim 12, wherein if any one of the non-gray color component parameters is less than the threshold parameter, d) comprises:
    determining 'A' by increasing each of the cyan, magenta and yellow color component parameters by an amount 'A' such that the low color component parameter is at least equal to the threshold parameter; and
    decreasing the black color component parameter by 'A'.

14. The method of claim 13, further comprising determining if the black color component parameter is less than the threshold parameter.

15. The method of claim 14, wherein if the black color component parameter is less than the threshold parameter, the method further comprises:
    determining 'B' by increasing the black color component parameter by an amount 'B' such that the black color component parameter is at least equal to the threshold parameter;
    decreasing each of the cyan, magenta and yellow color component parameters by 'B'; and
    turning off an associated housing for the low color component parameter.

16. A color image processor comprising;
    a determining means for determining whether a first color parameter of a plurality of non-gray color component parameters is less than a threshold parameter that corresponds to individual color component throughput;
    a first shifting means for shifting individual color component area coverages to either each be above the threshold parameter or to completely reduce to zero the coverage of first color component; and
    a second shifting means for shifting a black color component parameter in an amount equal to, but opposite from, the shift of the first color component.

17. A color xerographic device comprising:
    a cyan developer unit;
    a magenta developer unit;
    a yellow developer unit; and
    the color image processor of claim 16.

* * * * *